(12) United States Patent
Fukami et al.

(10) Patent No.: US 10,965,478 B2
(45) Date of Patent: Mar. 30, 2021

(54) SYSTEMS AND METHODS FOR PERFORMING LINK DISCONNECT

(71) Applicant: Apple Inc., Cupertino, CA (US)

(72) Inventors: Shawn Munetoshi Fukami, Newark, CA (US); Hengsheng Geng, Austin, TX (US)

(73) Assignee: Apple Inc., Cupertino, CA (US)

( * ) Notice: Subject to any disclaimer, the term of this patent is extended or adjusted under 35 U.S.C. 154(b) by 50 days.

(21) Appl. No.: 16/055,478

(22) Filed: Aug. 6, 2018

(65) Prior Publication Data

US 2020/0044877 A1 Feb. 6, 2020

(51) Int. Cl.
  *H04L 12/12* (2006.01)
  *H04L 29/08* (2006.01)
  *H04L 12/46* (2006.01)
  *H04L 12/933* (2013.01)

(52) U.S. Cl.
  CPC .......... *H04L 12/12* (2013.01); *H04L 12/4625* (2013.01); *H04L 49/109* (2013.01); *H04L 67/143* (2013.01); *H04L 67/1097* (2013.01)

(58) Field of Classification Search
  CPC ... H04L 12/12; H04L 12/4625; H04L 49/109; H04L 67/1097; H04L 67/143
  USPC ...................................................... 709/223
  See application file for complete search history.

(56) References Cited

U.S. PATENT DOCUMENTS

| | | | |
|---|---|---|---|
| 6,988,161 B2 | 1/2006 | McConnell et al. | |
| 9,417,687 B2 | 8/2016 | Ware | |
| 9,892,068 B2 | 2/2018 | Linstadt | |
| 2008/0126595 A1* | 5/2008 | Davis | H01R 13/70 710/19 |
| 2013/0145057 A1* | 6/2013 | Rathi | G06F 13/4286 710/38 |
| 2014/0101357 A1* | 4/2014 | Stolitzka | G06F 13/4022 710/316 |
| 2014/0149775 A1* | 5/2014 | Ware | G06F 1/3293 713/323 |
| 2018/0063016 A1* | 3/2018 | Gulati | H04L 49/109 |
| 2018/0181505 A1 | 6/2018 | Ware et al. | |

* cited by examiner

*Primary Examiner* — Thomas J Dailey
(74) *Attorney, Agent, or Firm* — Kowert Hood Munyon Rankin and Goetzel PC; Rory D. Rankin

(57) ABSTRACT

A system and method for efficiently disconnecting links in a communication fabric. A computing system includes a fabric for routing traffic among one or more agents and a memory controller for system memory. The fabric includes multiple hierarchical clusters with a split topology where the data links are physically separated from the control links. When the controller in an intermediate cluster or agent determines local resources are idle, the controller sends separate requests for link disconnect on each of the upstream control and data links. When a single acknowledgment of link disconnect is received, the controller does not proceed with any link disconnect. Rather, the controller waits until an acknowledgment of link disconnect is received for each of the upstream control and data links. If local resources remain idle, the controller sends confirmation upstream and performs a link disconnect for each of the upstream control and data links.

20 Claims, 8 Drawing Sheets

SYSTEMS AND METHODS FOR PERFORMING LINK DISCONNECT

BACKGROUND

Technical Field

Embodiments described herein relate to the field of computing systems and, more particularly, to efficiently disconnecting links in a communication fabric.

Description of the Related Art

Systems on chips (SoCs) are becoming increasingly complex with ever increasing numbers of agents within a typical SoC and available endpoints. The agents include one or more of multimedia engines, digital signal processors (DSPs) and processing units, each with one or more of a central processing unit (CPU) and a data parallel processor like a graphics processing unit (GPU). Endpoints include input/output (I/O) peripheral devices such as memory devices, communication interfaces such as radio communication interfaces, speakers, displays and so on. Data is shared among the different agents of the SoC and among the available endpoints.

Typically, an interconnect transports transactions from a source, such as an agent, to a destination such as another agent or an endpoint. In some cases, the interconnect is a communication fabric with a hierarchy of clusters between the agents and an endpoint such as a memory controller for system memory. Between each hierarchical level are multiple links. For functionality and performance reasons, a split topology is used where the data links are physically separated from the control links.

To reduce power consumption of the chip, idle states are used for agents, clusters within the communication fabric and other components. Sequences for link disconnect are used when each end of a link is idle. As used herein, a "link disconnect" is used to refer to performing steps to disconnect a link. In many cases, disconnecting a link results in performing steps for powering down the link. The split topology complicates these sequences as logical binding between the separate data links and control links cannot be removed entirely due to performance and functional constraints.

In view of the above, efficient methods and mechanisms for efficiently powering down links in a communication fabric are desired.

SUMMARY

Systems and methods for efficiently disconnecting links in a communication fabric are contemplated. In various embodiments, a computing system includes a communication fabric for routing traffic among one or more agents and one or more endpoints such as a memory controller for system memory. The "traffic" refers to one or more of access requests, messages and data corresponding to the access requests and the messages. The agents include one or more of multimedia engines, digital signal processors (DSPs) and processing units, each with one or more of a central processing unit (CPU) and a data parallel processor like a graphics processing unit (GPU). Each agent and each endpoint, such as the memory controller, is both a source and a destination for transactions depending on the direction of traffic flow through the communication fabric. The communication fabric is also referred to as the fabric.

In various embodiments, the fabric includes a hierarchy of clusters between the agents and an endpoint such as a memory controller for system memory. Between each hierarchical level of the fabric hierarchy are multiple links. For functionality and performance reasons, in various embodiments, a split topology is used where the data links are physically separated from the control links. The traffic transferred on control links include commands and messages. The traffic on data links include read response data and write data for read requests and write requests, respectively.

In some embodiments, resources within a cluster are also split similar to how the links are split. In various embodiments, the split resources include a combination of combinatorial logic and sequential elements for storing traffic, selecting traffic to process, such as using arbitration logic, sending the selected traffic on corresponding links and determining when to disconnect and wakeup links. As used herein, a "link disconnect" is used to refer to performing steps to disconnect a link. In many cases, disconnecting a link results in performing steps for powering down the link. In some embodiments, the resources in link interfaces, such as a bridge in an agent and link controllers in clusters, include one or more finite state machines for determining when to disconnect and wakeup links. For upstream and downstream control links, control resources of the split resources are used for performing the above steps with commands and messages. For upstream and downstream data links, data resources of the split resources are used for performing the above steps with read response data and write data.

The link controller in a cluster or agent is also referred to as a controller or an apparatus. When the link controller in the cluster or agent determines control resources are idle, the controller sends a request for link disconnect via an upstream control link to an external cluster higher up in the fabric hierarchy. The "request for link disconnect" is also referred to as a request for disconnecting a link. In many cases, disconnecting a link includes powering down the link. Similarly, when the controller determines data resources are idle, the controller sends a request for link disconnect via an upstream data link to an external cluster higher up in the fabric hierarchy. The controller maintains connection with the external upstream cluster via both the upstream control link and the upstream data link responsive to receiving fewer than two acknowledgements of link disconnect. The "acknowledgment of link disconnect" is also referred to as an acknowledgment of receiving a request to disconnect a link. In various embodiments, the two acknowledgments include an acknowledgment to disconnect a link received via the upstream control link and an acknowledgement to disconnect a link received via the upstream data link. Thus, the link disconnect is prevented on any link since link disconnect is logically handled together for both the control link and the separate data link.

When a single acknowledgment of link disconnect is received from the external upstream cluster, the controller for the intermediate cluster does not proceed with any link disconnect. Rather, the controller waits until an acknowledgment of link disconnect is received for both the upstream control link and the separate upstream data link. Another check is performed to determine each of the control resources and the data resources remain idle and have no tasks requiring immediate processing. If so, the controller sends confirmation to the external upstream cluster indicating that both acknowledgments of link disconnect had been received and the local resources remain idle. Afterward, the controller performs a link disconnect for each of the upstream control link and the separate upstream data link.

These and other embodiments will be further appreciated upon reference to the following description and drawings.

BRIEF DESCRIPTION OF THE DRAWINGS

The above and further advantages of the methods and mechanisms may be better understood by referring to the following description in conjunction with the accompanying drawings, in which.

Figure 1:
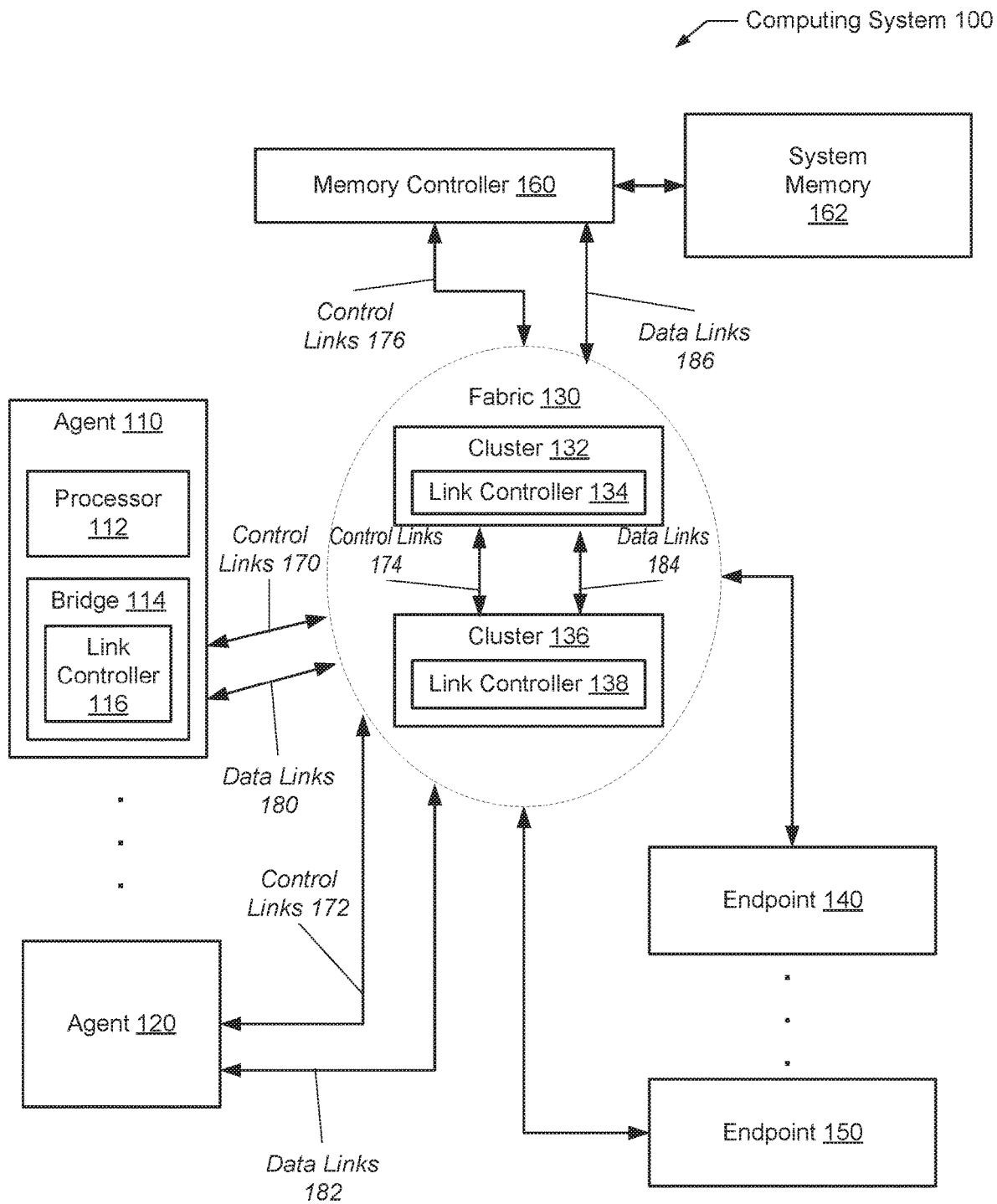
FIG. 1 is a block diagram of one embodiment of a computing system.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) for that unit/circuit/component.

DETAILED DESCRIPTION OF EMBODIMENTS

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

Referring to FIG. 1, a generalized block diagram of one embodiment of a computing system 100 is shown. In the illustrated embodiment, communication fabric 130, which is also referred to as fabric 130, routes traffic among agents 110-120, endpoints 140-150 and memory controller 160. In various embodiments, fabric 130 includes a hierarchy of clusters between agents 110-120 and memory controller 160. Although two clusters 132 and 136 are shown, in other embodiments, any number of clusters is used.

In various embodiments, the computing system 100 is a system on a chip (SoC) that includes multiple types of integrated circuits on a single semiconductor die, each integrated circuit providing a separate functionality. In some embodiments, computing system 100 is also referred to as an application specific integrated circuit (ASIC). In other embodiments, the agents 110-120 and endpoints 140-150 are individual dies within a package such as a multi-chip module (MCM). In yet other embodiments, the agents 110-120 and endpoints 140-150 are individual dies or chips on a printed circuit board.

Clock sources, such as phase lock loops (PLLs), interrupt controllers, power managers and so forth are not shown in FIG. 1 for ease of illustration. It is also noted that the number of components of the computing system 100 vary from embodiment to embodiment. In other embodiments, there are more or fewer of each component than the number shown for the computing system 100. In an embodiment, each of the agents 110-120 is a processor complex. The term "processor complex" is used to denote a configuration of one or more processor cores using local storage (not shown), such as a local shared cache memory subsystem, and capable of processing a workload together. For example, in an embodiment, the workload includes one or more programs comprising instructions executed by processor 112. Any instruction set architecture is implemented in various embodiments.

Each of the agents 110-120 includes a processor such as processor 112. Although a single processor is shown, in various embodiments, multiple processors are used, each with one or more processor cores. Processor 112 is one or more of a central processing unit (CPU), a data parallel processor like a graphics processing units (GPU), a digital signal processors (DSP), a multimedia engine, and so forth.

Different types of traffic flows independently through fabric 130. In some embodiments, fabric 130 utilizes a single physical fabric bus to include a number of overlaying virtual channels, or dedicated source and destination buffers, each carrying a different type of traffic. The "traffic" refers to one or more of access requests, messages and data corresponding to the access requests and the messages. In an embodiment, one or more channels are independently flow controlled with no dependence between transactions in different channels while other channels are dependent on transactions in another channel. In other embodiments, fabric 130 is packet-based, and includes a hierarchy with bridges, cross bar, point-to-point, or other interconnects.

In various embodiments, fabric 130 uses one or more bus protocols for transferring messages and data, enforcing an order between transactions with particular transaction types, and ensuring cache coherence among the different agents 110-120 and endpoints 140-150. The supported communication protocols determine allowable transfer sizes, supported burst transfer sizes, supported directions for simultaneous transfers, allowable number of outstanding requests while sending more requests, support of out-of-order completions, supported clock domains, supported interrupt mechanisms, and so forth. In some embodiments, the link interfaces, such as link controllers 116, 134 and 138, include communication protocol connections such as PCIe (Peripheral Component Interconnect Express), Advanced eXtensible Interface (AXI), InfiniBand, RapidIO, and so forth.

Clusters 132 and 136 include one or more buffers (not shown) for storing transactions and corresponding payload data during transport. Clusters 132 and 136 also include control logic (not shown) for selecting transactions to send from a source to a destination. Between each hierarchical level are multiple links. For functionality and performance reasons, in various embodiments, a split topology is used where the data links 184 in fabric 130 are physically separated from the control links 174. Similarly, the interfaces to fabric 130 use a split topology. As shown, agent 110 uses control links 170 and separate data links 180. Although a split topology is not shown for endpoints 140-150, in various embodiments, endpoints 140-150 also use a split topology.

In various embodiments, control links 170-176 transfer commands and messages, whereas, data links 180-186 transfer data corresponding to the commands and messages. In some embodiments, the commands include read requests and write requests, and the messages indicate when response data is ready and provide an index of where the response data is stored in a cluster such as cluster 136. The data corresponding to the commands and messages include write data being sent from an agent, such as agent 110, to memory controller 160. The data also include read response data from memory controller 160 to an agent such as agent 110.

In various embodiments, one or more of the control links 170-176 and data links 180-186 are a point-to-point communication channel. At the physical level, a link includes one or more lanes. In various embodiments, link interfaces, such as link controllers 116, 134 and 138, include split resources with control resources being used for processing commands and messages and separate data resources being used for processing data corresponding to the commands and messages. In various embodiments, the split resources include a combination of combinatorial logic and sequential elements for storing traffic, selecting traffic to process, such as using arbitration logic, sending the selected traffic on corresponding links and determining when to disconnect and wakeup links.

In some embodiments, the resources in link interfaces, such as bridge 114 and link controllers 134 and 138, include one or more finite state machines for determining when to disconnect and wakeup links. As used herein, a "link disconnect" is used to refer to performing steps to disconnect a link. In many cases, disconnecting a link results in performing steps for powering down the link. For upstream and downstream control links, control resources of the split resources are used with received commands and messages for performing the above steps of storing, selecting, and sending on corresponding links. For upstream and downstream data links, data resources of the split resources are used for performing the above steps with read response data and write data.

In some embodiments, the functionality of link controllers 116, 134 and 138 is implemented in hardware such as circuitry. In other embodiments, the functionality of link controllers 116, 134 and 138 is implemented in a combination of hardware and software.

In some embodiments, link controllers 116, 134 and 138 determine when resources are idle and generate requests for link disconnect. The "request for link disconnect" is also referred to as a request for disconnecting a link. In many cases, disconnecting a link includes powering down the link. When the controllers 116, 134 and 138 determine control resources are idle, a request for link disconnect for control links is generated and sent to an external cluster higher up in the fabric hierarchy. Similarly, when the controllers 116, 134 and 138 determine data resources are idle, a request for link disconnect for data links is generated and sent to an external cluster higher up in the fabric hierarchy. Therefore, separate requests for link disconnect are sent. These generated requests are sent upstream to the next hierarchical level. For example, in an embodiment, link controller 116 sends any requests for link disconnect to link controller 138. Link controller 138 sends requests for link disconnect to link controller 134. Link controller 134 sends requests for link disconnect to memory controller 160.

In some embodiments, requests for link disconnect travel from the lowest level in the hierarchy, such as link controller 116 in agent 110, to the highest level in the hierarchy such as memory controller 160. In some embodiments, requests for link disconnect originate at the lowest level in the hierarchy such as link controller 116. In other embodiments, requests for link disconnect originate anywhere in the hierarchy such as originating at link controller 138. In various embodiments, when a single acknowledgment of link disconnect is received at one of the link controllers 116, 134 and 138, the link controller does not proceed with any link disconnect. The "acknowledgment of link disconnect" is also referred to as an acknowledgment of receiving a request to disconnect a link. Rather, the link controller waits until an acknowledgment of link disconnect is received for each of the upstream control link and the upstream data link. The acknowledgment of link disconnect is also referred to as an acknowledgment of power down links. If local control resources and data resources remain idle, then the link controller sends confirmation upstream and performs a link disconnect for each of the upstream control link and the upstream data link. Before describing more details of the link disconnect and wakeup steps, a further description of the components in computing system 100 is provided.

In some embodiments, components within agent 120 are similar to components in agent 110. In other embodiments, components in agent 120 are designed for lower power consumption, and therefore, include control logic and processing capability producing less performance. In such embodiments, supported clock frequencies are less than supported clock frequencies in agent 110. In addition, one or more of the processor cores in agent 120 include a smaller number of execution pipelines and/or functional blocks for processing relatively high power consuming instructions than what is supported by the processor cores in agent 110.

Endpoints 140-150 are representative of any number and type of components coupled to fabric 130. For example, in some embodiments, endpoints 140-150 include one or more cameras, flash controllers, display controllers, media controllers, graphics units, communication interfaces such as radio communication interfaces, and/or other devices. Endpoints 140-150 are also representative of any number of input/output (I/O) interfaces or devices and provide interfaces to any type of peripheral device implementing any hardware functionality included in computing system 100. For example, in an embodiment, any of the endpoints 140-150 connect to audio peripherals such as microphones, speakers, interfaces to microphones and speakers, audio processors, digital signal processors, mixers, etc. Other I/O devices include interface controllers for various interfaces external to computing system 100, including interfaces such as Universal Serial Bus (USB), peripheral component interconnect (PCI) including PCI Express (PCIe), serial and parallel ports, general-purpose I/O (GPIO), a universal asynchronous receiver/transmitter (uART), a FireWire interface, an Ethernet interface, an analog-to-digital converter (ADC), a digital-to-analog converter (DAC), and so forth. Other I/O devices include networking peripherals such as media access controllers (MACs).

Memory controller 160 interfaces with system memory 162. Memory controller 160 includes any number of memory ports, generates proper clocking to memory devices, and interfaces to system memory 162. System memory 162 includes one or more of dynamic random access memory (DRAM) such as synchronous DRAM (SDRAM) (including mobile versions of the SDRAMs such as mDDR3, etc., and/or low power versions of the SDRAMs such as LPDDR4, etc.), RAMBUS DRAM (RDRAM), double data rate (DDR) SDRAM, DDR2 SDRAM, Rambus DRAM (RDRAM), static RAM (SRAM), GDDR4 (Graphics Double Data Rate, version 4) SDRAM, GDDR5 (Graphics Double Data Rate, version 5) SDRAM, etc.

Figure 2:
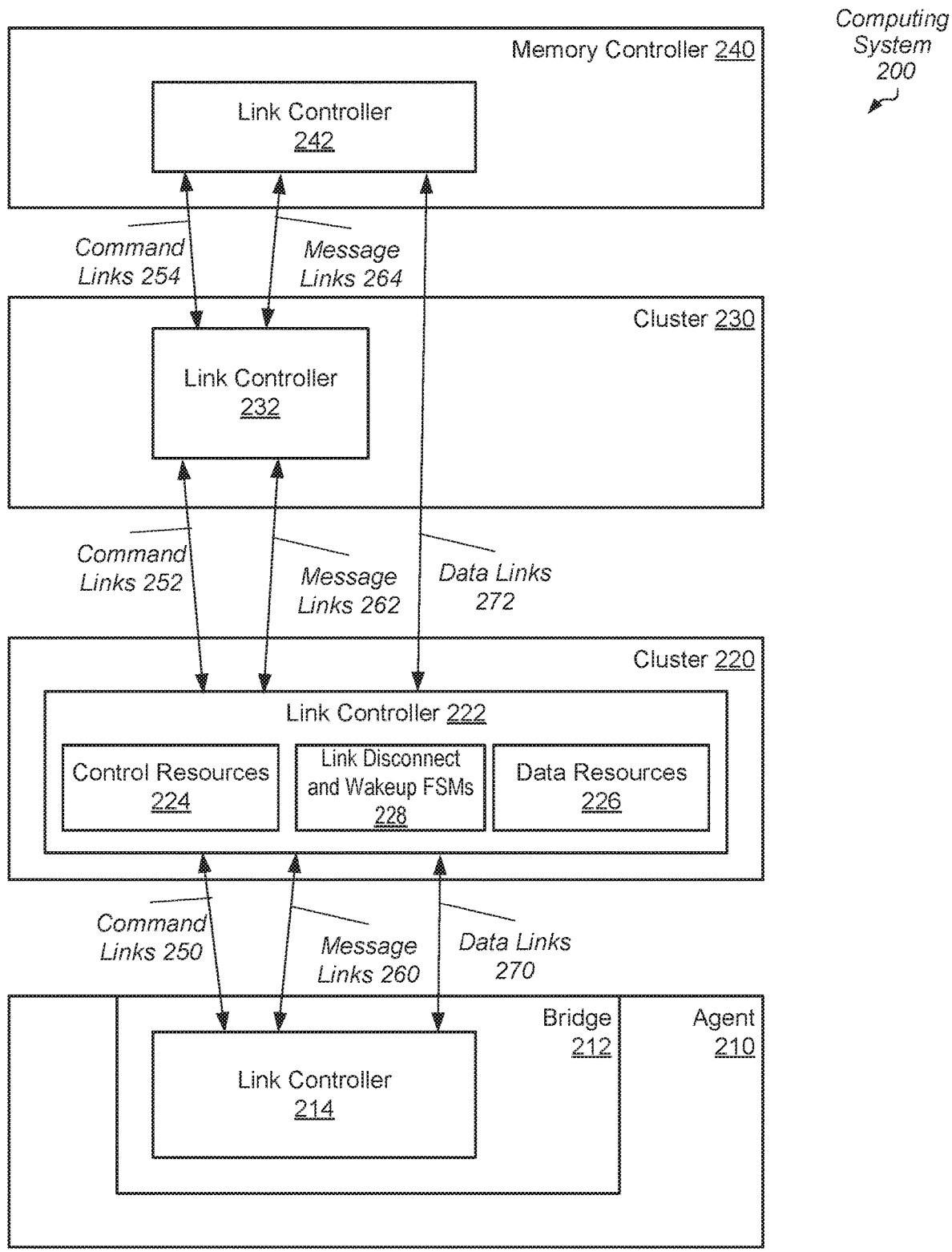
FIG. 2 is a block diagram of one embodiment of a computing system.

Turning to FIG. 2, a generalized block diagram illustrating another embodiment of a computing system 200 is shown. In the illustrated embodiment, a hierarchy of clusters is placed between agent 210 and memory controller 240. Although two clusters 220 and 230 are shown, in other embodiments, any number of clusters is used. In various embodiments, agent 210, clusters 220-230 and memory controller 240 include components and functionality of agent 110, clusters 132 and 136, and memory controller 160 of computing system 100 (of FIG. 1).

For write requests, the source is agent 220 and the destination is memory controller 240. In contrast, for read requests, the source is memory controller 240 and the destination is agent 220. For functionality and performance reasons, in various embodiments, a split topology is used where the command links 250-254, message links 260-264 and data links 270-272 are physically separated from one another. In an embodiment, command links 250-254 include read requests and write requests and message links 260-264 indicate messages indicating when response data is ready and provide an index of where the response data is stored in a cluster such as cluster 220. The data corresponding to the commands and messages are transferred on data links 270-272. The data includes write data being sent from agent 210 to memory controller 240. The data also includes read response data from memory controller 240 to agent 210.

In various embodiments, link interfaces, such as bridge 212 and link controllers 222 and 232, include split resources with control resources being used for processing commands and messages and separate data resources being used for processing data corresponding to the commands and messages. Although split resources are only shown for link controller 222 for ease of illustration, link controllers 214, 232 and 242 also include split resources. As shown, link controller 222 in cluster 220 includes control resources 224 for transferring commands and messages received from downstream command links 250, downstream message links 260, upstream command links 252 and upstream message links 262. For example, in an embodiment, control resources 224 include one or more buffers for storing command and message transactions.

Control resources 224 also include control logic for selecting transactions for deallocation from buffers and send from a source to a destination. For example, control resources 224 includes one or more arbiters for selecting transactions to send on a given link based on one or more of a priority level, age, data size of the transaction, and so forth. Similarly, link controller 222 also includes separate data resources 226 for transferring data corresponding to commands and messages. The data is transferred between memory controller 240 and link controller 222 on upstream data links 272. The data is transferred between agent 210 and link controller 222 on downstream data links 270.

In some embodiments, data resources 226 in link controller 222 includes one or more downstream data stores for storing read response data. In some embodiments, data stored in a downstream data store is stored in one or more of flip-flops or other types of registers, one of a variety of random access memory (RAM) cells, content addressable memory (CAM) structure, or other. In some embodiments, a message is sent from cluster 220 to agent 210 on message links 260, and the message indicates read response data is available in a downstream data store in data resources 226. The message includes an index specifying where the response data is stored in the downstream data store. When the agent 210 is read, agent 210 sends a message on message links 260 to retrieve the read response data from data resources 226. In a similar manner, link controller 232 in cluster 230 includes an upstream data store for write data corresponding to a write command sent on command links 254 to link controller 242 in memory controller 240.

Link controller 232 in cluster 230 includes one or more upstream data stores for storing write data for write requests. In the illustrated embodiment, link controller 232 in cluster 230 does not include buffers or data stores for storing downstream data transferred between link controller 242 in memory controller 240 and link controller 222 in cluster 220. Therefore, cluster 230 does not provide a point-to-point flow control for the downstream data path. Rather, link controller 242 and link controller 222 provide an end-to-end flow control for the downstream data path. In the illustrated embodiment, downstream interface going through cluster 230 is considered as a wire. Cluster 230 forwards the downstream data path to link 222.

In addition to control resources 224 and data resources 226, as shown, link controller 222 includes link disconnect and wakeup finite state machines (FSMs) 228, which is also referred to as FSMs 228. Each of the link controllers 214, 232 and 242 also include FSMs similar to FSMs 228 for performing steps for link disconnect and wakeup. In various embodiments, when link controller 214 determines local control resources are idle, link controller 214 sends a request for link disconnect on one or more of command links 250 and message links 260. When link controller 214 determines local data resources are idle, link controller 214 sends a request for link disconnect on data links 270. Therefore, requests for link disconnect are separated for the control path and the data path for the split topology.

FSMs 228 receives the separate requests for link disconnect from link controller 214 and separately determines whether control resources 224 are idle and data resources 226 are idle. If control resources 224 are idle, FSMs 228 sends an acknowledgment of link disconnect to link controller 214 on one or more of command links 250 and message links 260. If data resources 226 are idle, FSMs 228 sends an acknowledgment of link disconnect to link controller 214 on data links 270. When a single acknowledgment of link disconnect is received, link controller 214 does not proceed with any link disconnect. Rather, link controller 214 waits until an acknowledgment of link disconnect is received for each of the control path on command links 250 or message links 260 and the data path on data links 270.

When separate acknowledgments of link disconnect are received, and if local resources remain idle, link controller 214 sends confirmation upstream to link controller 222. Afterward, link controller 214 performs a link disconnect for data links 270 and one or more of the command links 250 and message links 260. When link controller 222 receives confirmation, link controller 222 performs a link disconnect for data links 270 and one or more of the command links 250 and message links 260. Similar steps are performed for requesting, acknowledging and performing link disconnect by link controllers 232 and 242.

As described earlier, link controller 232 of cluster 230 does not provide a point-to-point flow control for the downstream data path. Rather, link controller 242 and link controller 222 provide an end-to-end flow control for the downstream data path. When link controller 222 of cluster 220 receives a request for a link disconnect on one or more of the command links 250 and message links 260, link controller 222 rejects the request for the link disconnect on the downstream control path when link controller 222 detects certain conditions. In an embodiment, the certain conditions include link controller 222 receives a request for a link disconnect on data links 270, link controller 222 determines data resources 226 received write data of an asynchronous write request from data links 272, and link controller 222 determines the data resources 226 are idle. In some embodiments, the asynchronous write request is a configuration register write request from another agent. In various embodiments, configuration register write requests traverse from source agents through the memory controller to destination agents. The memory controller is used as a single ordering point.

In various embodiments, the write data of the asynchronous write request reaches cluster 220 on data links 272 significantly sooner than cluster 220 receives the asynchronous write request on command links 252. If FSMs 228 determines the control resources are idle, then without the rejection, link controller 222 would send an acknowledgment for link disconnect on the downstream control path on command links 250. Afterward, link controller 222 would receive confirmation and perform the link disconnect of command links 250. However, later, link controller 222 receives the asynchronous write request on command links 252. Now, link controller 222 would need to perform the steps of a link wakeup for command links 250, thus, adding significant latency to the processing of the asynchronous write request. The rejection prevents the link disconnect of command links 250 and removes the additional latency of a link wakeup for command links 250.

Figure 3:
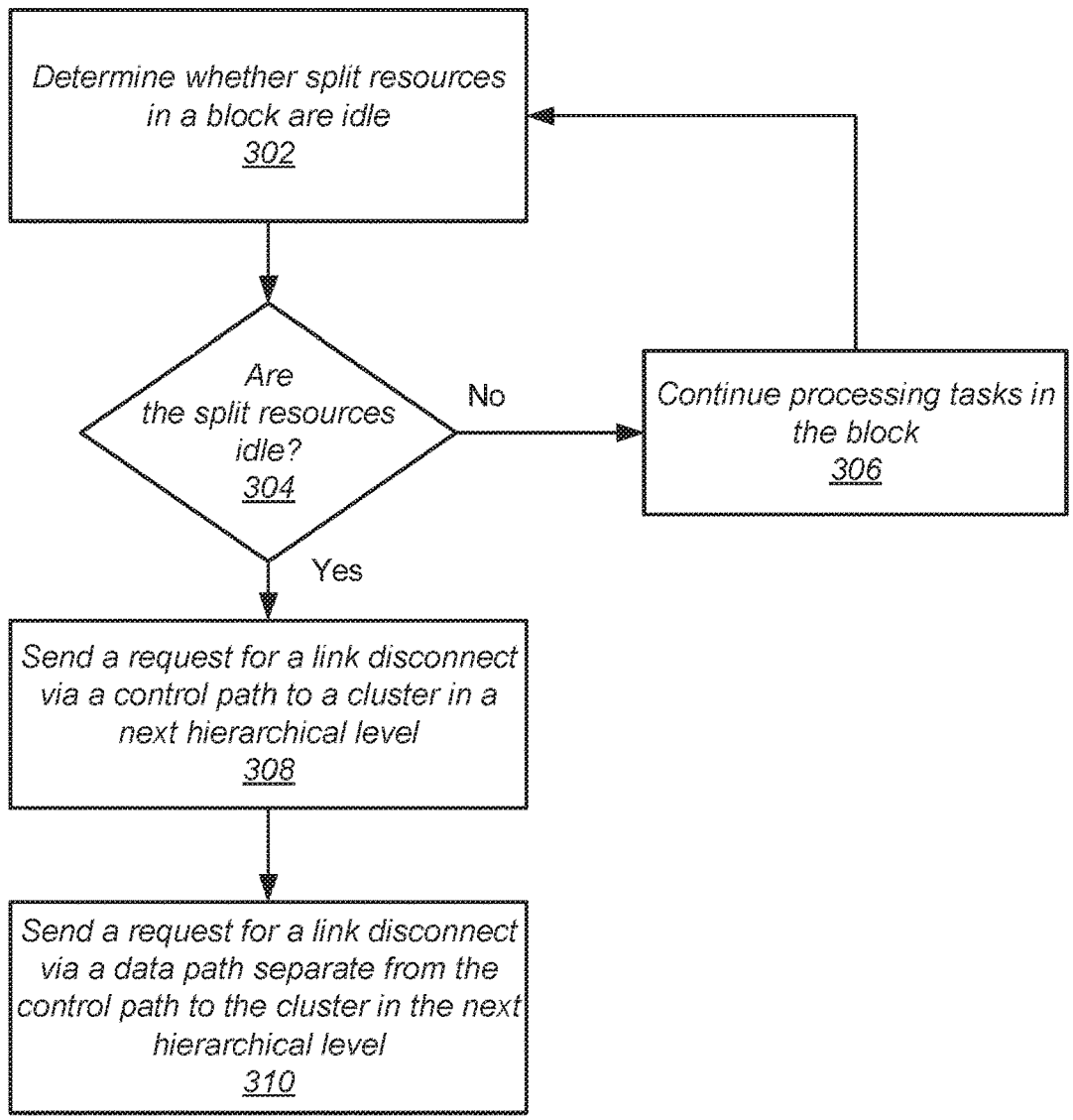
FIG. 3 is a flow diagram of one embodiment of a method for efficiently disconnecting links in a communication fabric.

Referring now to FIG. 3, a generalized flow diagram of one embodiment of a method 300 for efficiently disconnecting links in a communication fabric is shown. For purposes of discussion, the steps in this embodiment (as well as for FIGS. 4-8) are shown in sequential order. However, in other embodiments some steps may occur in a different order than shown, some steps may be performed concurrently, some steps may be combined with other steps, and some steps may be absent.

Split resources in a block are determined to be idle (block 302). In an embodiment, the block is a bridge within an agent in a computing system. Examples of agents was provided earlier. In another embodiment, the block is a cluster in a fabric hierarchy. In various embodiments, link interfaces include link controllers with split resources. Additionally, the link interfaces transfer commands and data on separate links in a split topology. The split resources include control resources being used for processing commands and messages transferred on the control links. Separate data resources are used for processing data corresponding to the commands and messages, which are transferred on data links different from the control links.

As described earlier, in various embodiments, the split resources include a combination of combinatorial logic and sequential elements for storing traffic, selecting traffic to process, such as using arbitration logic, sending the selected traffic on corresponding links and determining when to disconnect and wakeup links. For upstream and downstream control links, control resources of the split resources are used with received commands and messages for performing the above steps of storing, selecting, and sending traffic on corresponding links. For upstream and downstream data links, data resources of the split resources are used for performing the above steps with read response data and write data.

In some embodiments, processors or other computing engines report an idle state to each of a local power manager within the block and a link controller within the block. In another embodiment, the local power manager reports the idle state(s) to the link controller. In an embodiment, an indication of being idle specifies that there are no tasks to perform in the block. In another embodiment, an indication of being idle specifies that remaining tasks in the block include only tasks with a priority level below a threshold. In some embodiments, an indication of being idle specifies that the number of remaining tasks is below a first threshold and each of the remaining tasks have a priority level below a second threshold. Therefore, although there are outstanding tasks, performance does not appreciably reduce due to delaying completion of the remaining tasks.

If the split resources are not idle ("no" branch of the conditional block 304), then the split resources in the block continue processing tasks in the block (block 306). In one example, one of the split control resources and split data resources is idle while the other separate one of the split resources is active with transferring tasks. In one embodiment, in such an example, the block prevents sending any requests for a link disconnect. In another embodiment, the block sends a single request for a link disconnect corresponding to the idle resources. For example, when the link controller in the block determines control resources are idle, but the data resources are active, the link controller sends a single request for link disconnect to an external cluster higher up in the fabric hierarchy on the control links. Similarly, when the link controller determines data resources are idle, but the control resources are active, the link controller sends a single request for link disconnect to the external cluster higher up in the fabric hierarchy on the data links.

If the split resources are idle ("yes" branch of the conditional block 304), then a request for link disconnect is sent to the external cluster higher up in the fabric hierarchy on the control links (block 308). In this case, each of the split control resources and split data resources is idle. A request for link disconnect is also sent to the external cluster higher up in the fabric hierarchy on the data links (block 310), which are separate from the control links.

Figure 4:
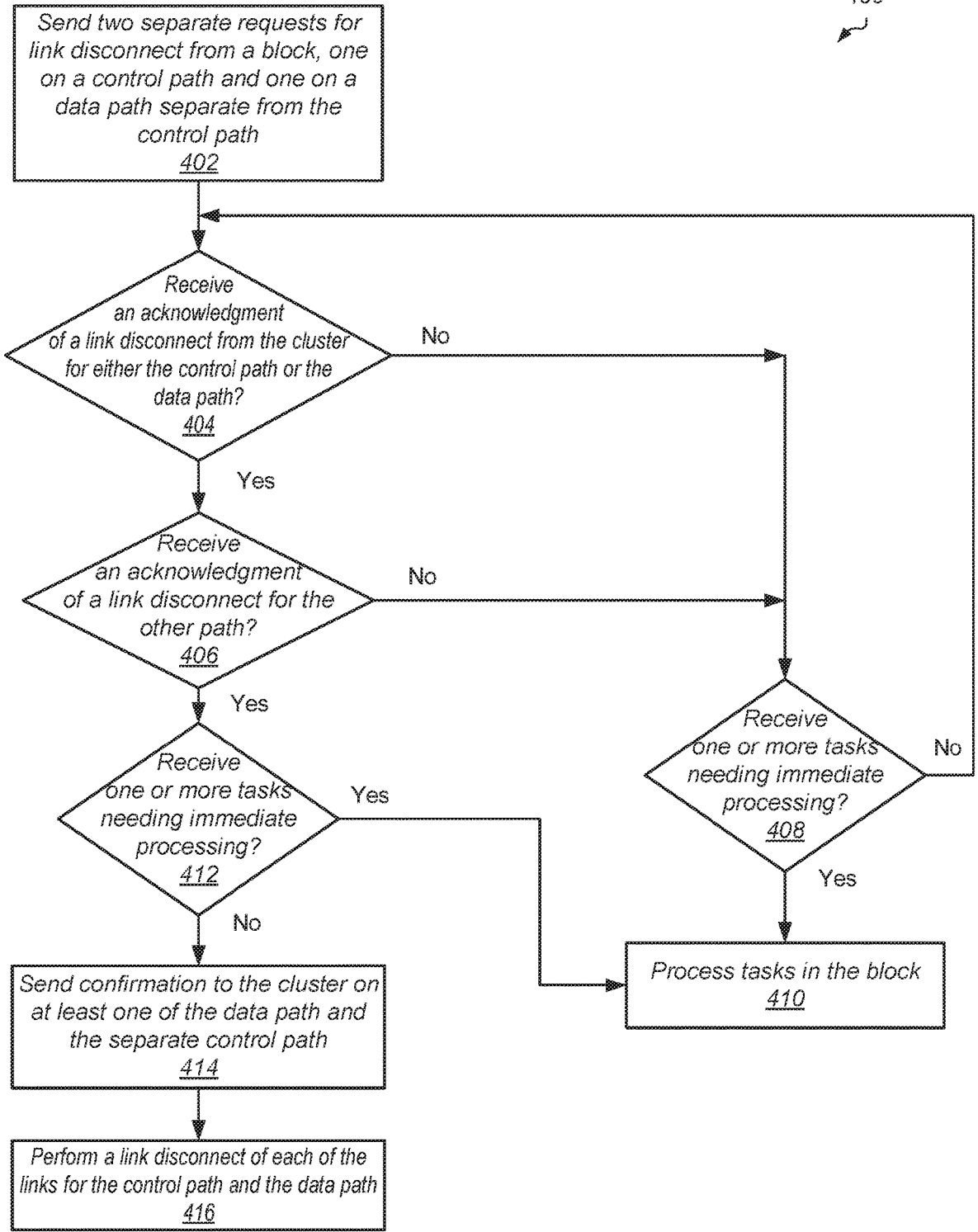
FIG. 4 is a flow diagram of one embodiment of a method for efficiently disconnecting links in a communication fabric.

Referring now to FIG. 4, a generalized flow diagram of one embodiment of a method 400 for efficiently disconnecting links in a communication fabric is shown. Two separate link disconnect requests are sent from a block to a cluster with one request on a control path and another request on a data path separate from the control path (block 402). In an embodiment, the cluster is in the next hierarchical level of a fabric hierarchy. In one embodiment, the block is a bridge within an agent in a computing system. Examples of agents was provided earlier. In another embodiment, the block is a cluster in a fabric hierarchy. In various embodiments, link interfaces include link controllers with split resources. Additionally, the link interfaces transfer commands and data on separate links in a split topology.

If an acknowledgment of a link disconnect from the cluster for either the control path or the data path is not received ("no" branch of the conditional block 404), and no tasks requiring immediate processing is received ("no" branch of the conditional block 408), then control flow of method 400 returns to conditional block 404. In some embodiments, determining whether tasks require immediate processing is based on a priority level, a data size associated with the task, or other. However, if one or more tasks requiring immediate processing are received ("yes" branch of the conditional block 408), then the tasks are processed (block 410).

If an acknowledgment of a link disconnect from the cluster for either the control path or the data path is received ("yes" branch of the conditional block 404), but an acknowledgment of a link disconnect from the cluster for the other path is not received ("no" branch of the conditional block 406), then control flow of method 400 moves to conditional block 408. Therefore, despite having a split topology with separate control links and data links, the block does not proceed with link disconnect until an acknowledgment of link disconnect is received on each of the two types of links—the control links and the separate data links. Thus, the link disconnect is prevented on any link since link disconnect is logically handled together for the control links and the separate data links.

If an acknowledgment of a link disconnect from the cluster for the other path is received ("yes" branch of the conditional block 406), then an acknowledgment for link disconnect is received for each of the control path and the data path. If one or more tasks requiring immediate processing are received ("yes" branch of the conditional block 408), then the tasks are processed (block 410). If no tasks requiring immediate processing is received ("no" branch of the conditional block 412), then confirmation is sent to the cluster on at least one of the data path and the separate control path (block 414). Afterward, a link disconnect is performed for each of the links for the control path and the data path (block 416).

Figure 5:
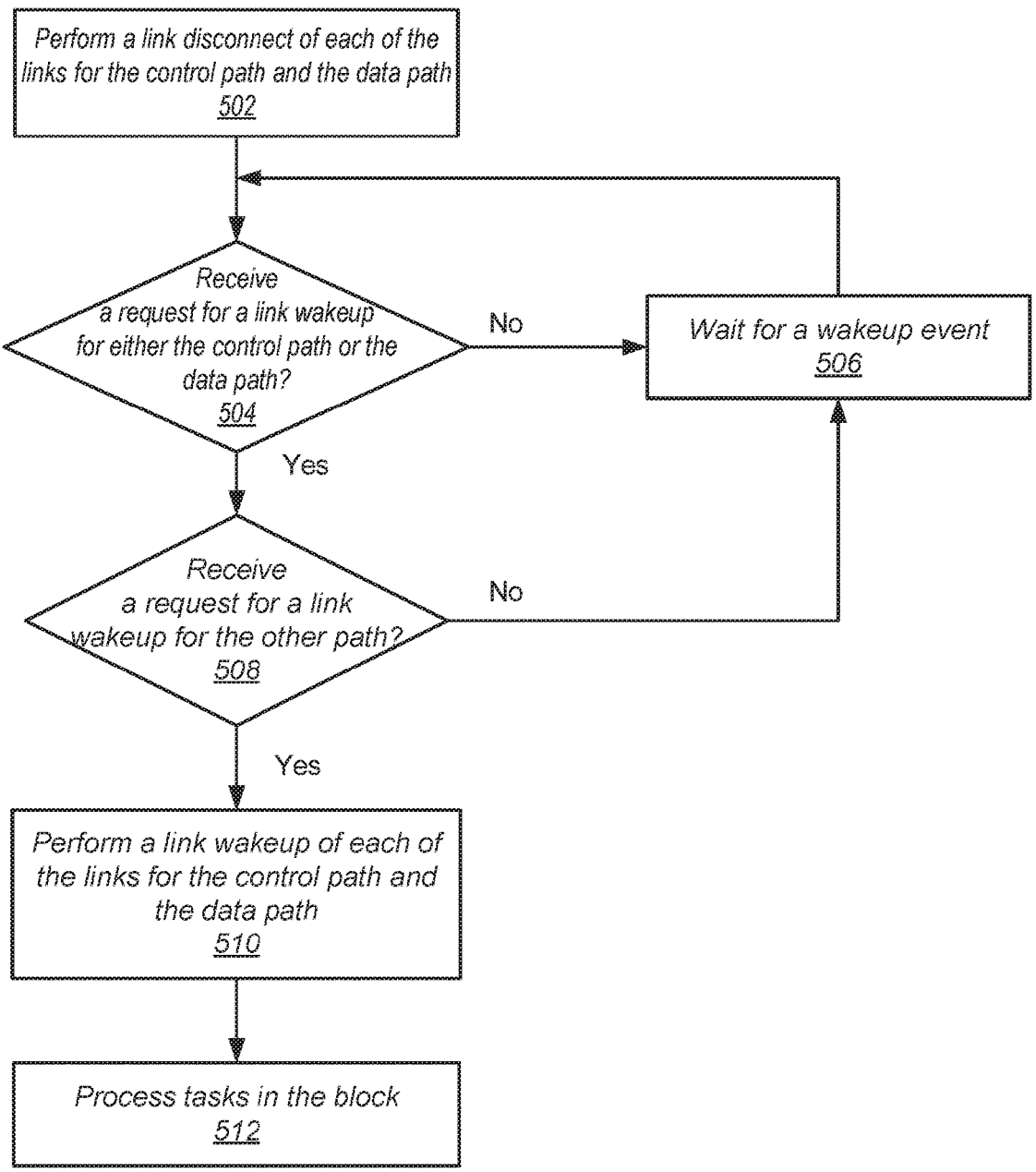
FIG. 5 is a flow diagram of one embodiment of a method for efficiently disconnecting links in a communication fabric.

Referring now to FIG. 5, a generalized flow diagram of one embodiment of a method 500 for efficiently disconnecting links in a communication fabric is shown. In various embodiments, a fabric uses multiple clusters in a fabric hierarchy between at least one agent and a memory controller. Between each hierarchical level are multiple links. For functionality and performance reasons, a split topology is used where the data links are physically separated from the control links. In an embodiment, a block is a bridge within an agent. In another embodiment, the block is a cluster in the fabric. At a given block, link disconnect of each of the links for the control path and the data path is performed (block 502).

If a request for a link wakeup is not received for either the control path or the data path ("no" branch of the conditional block 504), then the link controller in the block waits for a wakeup event (block 506). If a request for a link wakeup is received for either the control path or the data path ("yes" branch of the conditional block 504), but a request for a link wakeup is not received for the other path ("no" branch of the conditional block 508), then control flow of method 500 moves to block 506 where the link controller in the block waits for a wakeup event. If a request for a link wakeup is received for the other path ("yes" branch of the conditional block 508), then a link wakeup is performed for each of the links for the control path and the data path (block 510). Afterward, tasks are processed in the block with traffic received on the links of the control path and the data path.

Figure 6:
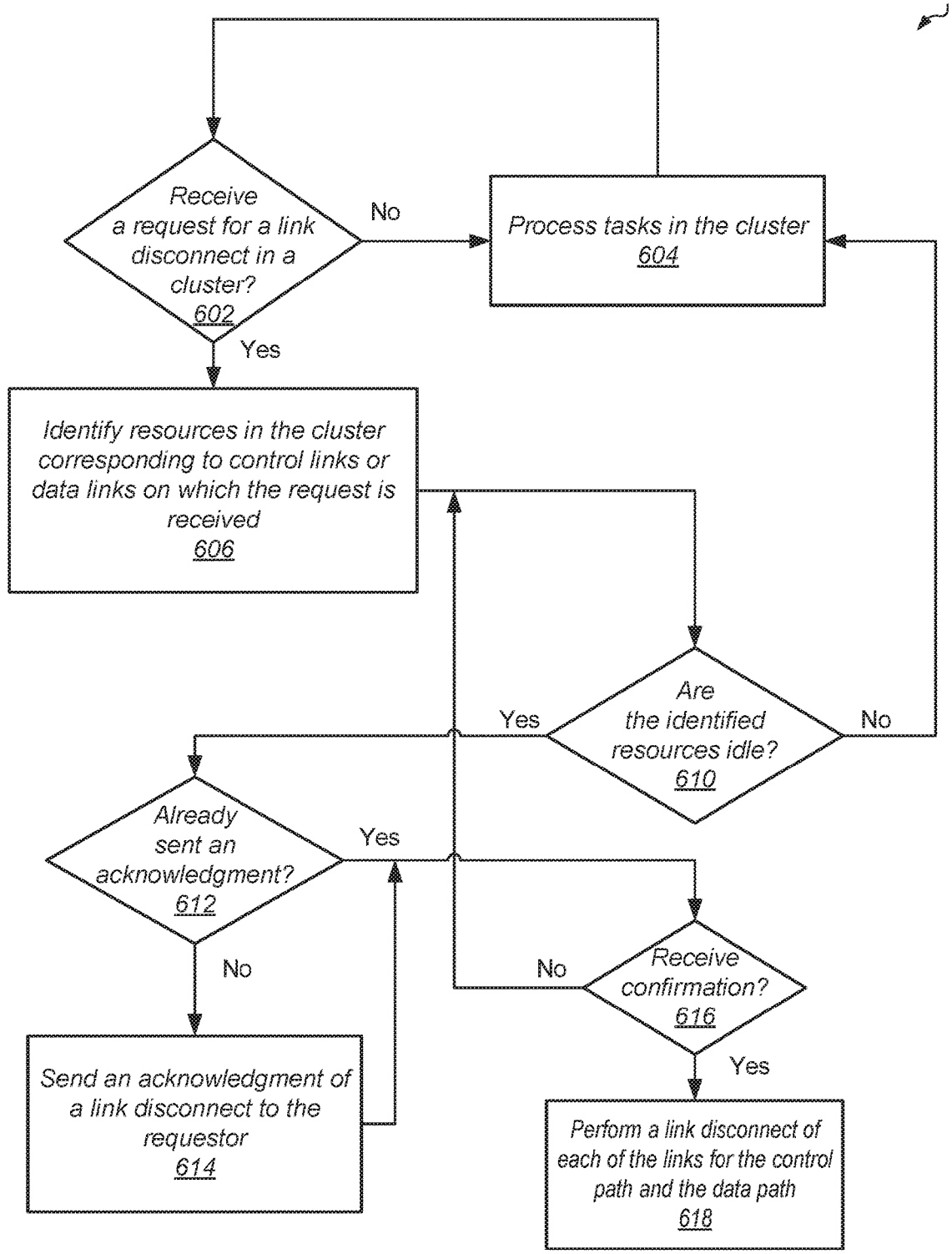
FIG. 6 is a flow diagram of one embodiment of a method for efficiently disconnecting links in a communication fabric.

Referring now to FIG. 6, a generalized flow diagram of one embodiment of a method 600 for efficiently disconnecting links in a communication fabric is shown. If a request for a link disconnect is not received at a cluster in a fabric hierarchy ("no" branch of the conditional block 602), then any remaining tasks are processed in the cluster (block 604). If a request for a link disconnect is received at the cluster in the fabric hierarchy ("yes" branch of the conditional block 602), then resources are identified in the cluster corresponding to control links or separate data links on which the request is received (block 606). For example, in various embodiments, the cluster includes control resources and separate data resources.

In some embodiments, the identified resources are determined to be idle when there are no remaining tasks using the identified resources. In other embodiments, the identified resources are determined to be idle when the remaining tasks using the identified resources include only a number of tasks below a first threshold, each with a priority level below a second threshold. If the identified resources are not idle ("no" branch of the conditional block 610), then remaining tasks are processed in the cluster (block 604). If the identified resources are idle ("yes" branch of the conditional block 610), and the cluster has not sent an acknowledgment of link disconnect ("no" branch of the conditional block 612), then an acknowledgment of a link disconnect is sent to the requestor (block 614). In various embodiments, the requestor is an agent or another cluster at a lower hierarchical level in the fabric hierarchy.

If the identified resources are idle ("yes" branch of the conditional block 610), and the cluster has sent an acknowledgment of link disconnect ("yes" branch of the conditional block 612), but the cluster has not received confirmation ("no" branch of the conditional block 616), then control flow of method 600 returns to block 610 where it is determined whether remaining tasks using the identified resources include only a number of tasks below a first threshold, each with a priority level below a second threshold. In various embodiments, confirmation indicates that both acknowledgments of link disconnect had been received at the requestor and the local resources in the requestor remain idle. As described earlier, in various embodiments, the requestor is an agent or another cluster at a lower hierarchical level in the fabric hierarchy. Afterward, the link controller in the requestor performs a link disconnect for each of the upstream control link and the separate upstream data link. However, if the cluster has not received this confirmation, then the link disconnect steps have not begun in the requestor at the lower level of the fabric hierarchy.

If the identified resources are idle ("yes" branch of the conditional block 610), and the cluster has sent an acknowledgment of link disconnect ("yes" branch of the conditional block 612), and the cluster has received confirmation ("yes" branch of the conditional block 616), then a link disconnect is performed for each of the links for the control path and the data path (block 618). In various embodiments, a single confirmation is used to indicate the requestor is performing a link disconnect for each of the control links and the data links.

Figure 7:
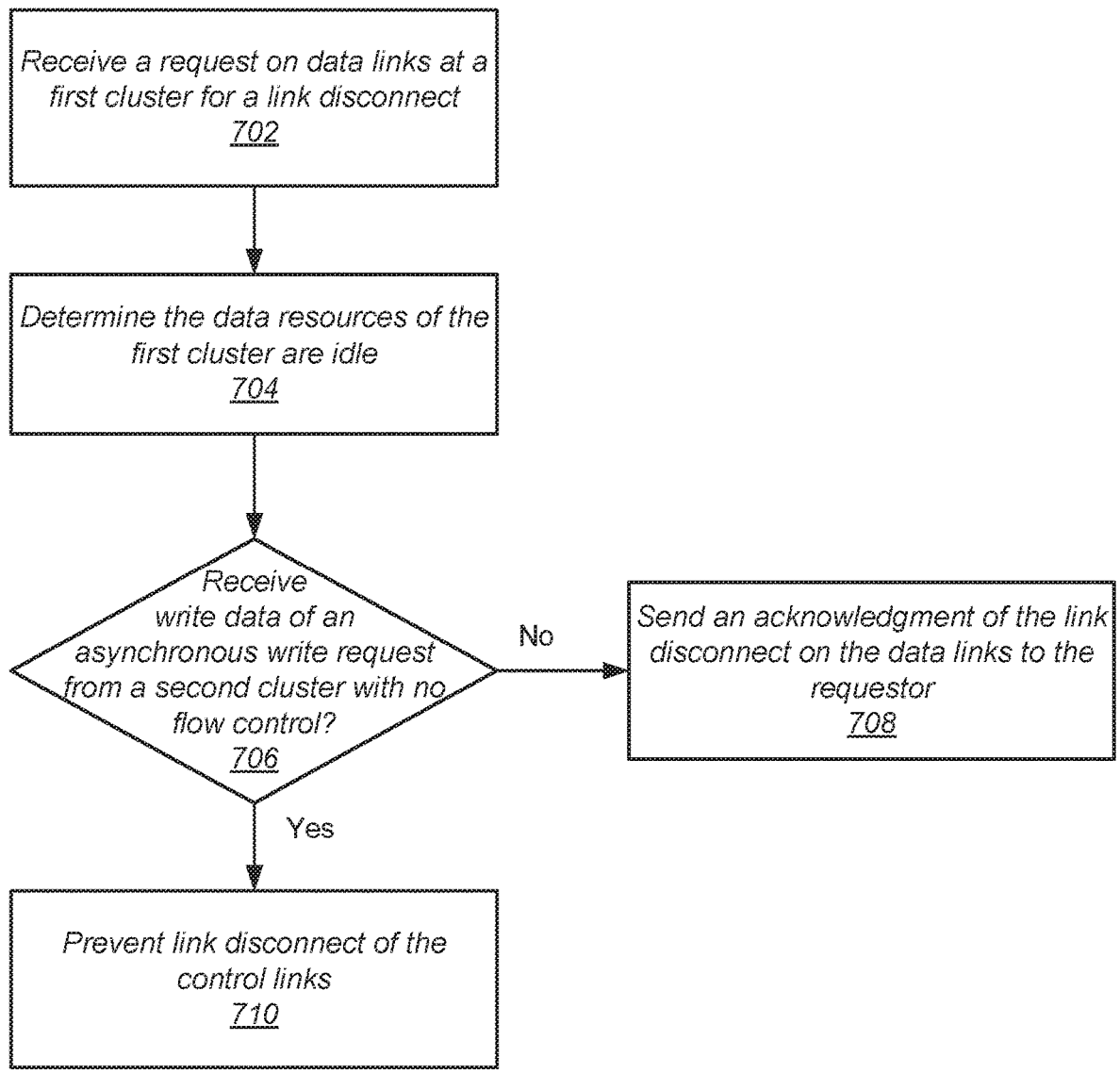
FIG. 7 is a flow diagram of one embodiment of a method for efficiently disconnecting links in a communication fabric.

Referring now to FIG. 7, a generalized flow diagram of one embodiment of a method 700 for efficiently powering down links in a communication fabric is shown. A request for a link disconnect is received at a cluster on data links (block 702). In various embodiments, a split topology is used where the data links in a fabric are physically separated from the control links. The interfaces to the fabric also use a split topology. For example, bridges within agents use control links and separate data links. Similarly, link controllers within clusters in the fabric use control links and separate data links. In various embodiments, link controllers in the clusters use control resources and separate data resources.

It is determined that the data resources are idle (block 704). As described earlier, in an embodiment, the data resources are determined to be idle when there are no remaining tasks using the data resources. In other embodiments, the data resources are determined to be idle when the remaining tasks using the data resources include only a number of tasks below a first threshold, each with a priority level below a second threshold. Therefore, although there are outstanding tasks in the data resources, performance does not appreciably reduce due to delaying completion of the remaining tasks.

In various embodiments, configuration register write requests traverse from source agents through the memory controller to destination agents. The memory controller is used as a single ordering point. If write data of an asynchronous write request is not received at a first cluster from a second cluster with no flow control ("no" branch of the conditional block 706), then an acknowledgment of the link disconnect is sent on the data links from the first cluster to the requestor (block 708). If write data of an asynchronous write request is received at the first cluster from the second cluster with no flow control ("yes" branch of the conditional block 706), then the first cluster prevents link disconnect of the control links (block 710). In an embodiment, the data resources of the first cluster sends an indication to the control resources of the first cluster specifying to reject any request for a link disconnect of the control links.

Since the second cluster has no flow control for downstream data, any asynchronous write request would have its write data arrive at the data resources of the first cluster sooner than the corresponding write request arrives at the separate control resources of the first cluster. An appreciable delay occurs when the control resources are allowed to complete link disconnect of the control links before the asynchronous write request arrives and then perform a link wakeup of the control links due to the arrival of the asynchronous write request. This delay is removed by having the data resources send an indication to the control resources to reject any link disconnect of the control links when the data resources receives the write data of the asynchronous write request.

Figure 8:
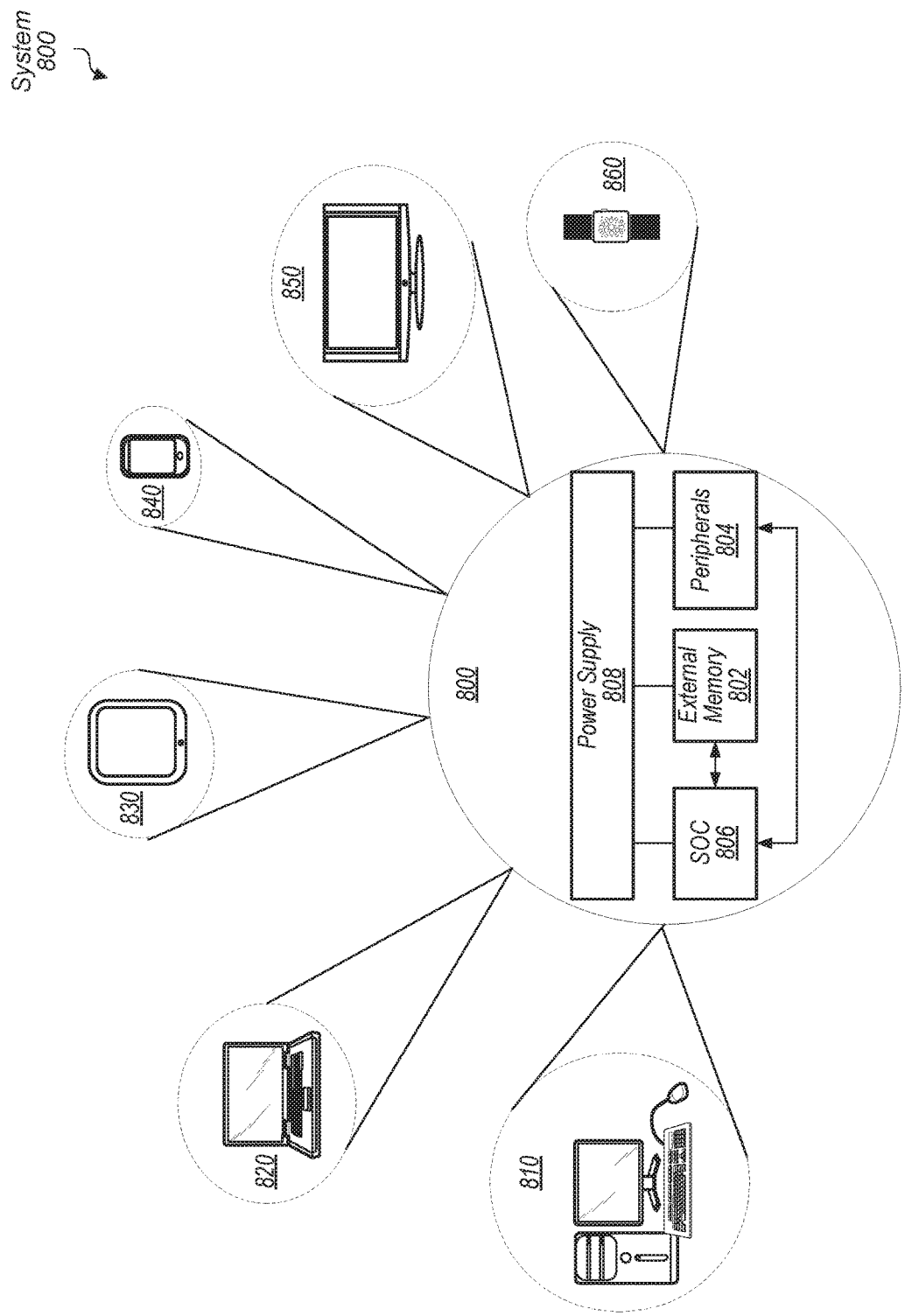
FIG. 8 is a block diagram of one embodiment of a system.

Turning next to FIG. 8, a block diagram of one embodiment of a system 800 is shown. As shown, system 800 represents chip, circuitry, components, etc., of a desktop computer 810, laptop computer 820, tablet computer 830, cell or mobile phone 840, television 850 (or set top box coupled to a television), wrist watch or other wearable item 860, or otherwise. Other devices are possible and are contemplated. In the illustrated embodiment, the system 800 includes at least one instance of a system on chip (SoC) 806 which includes multiple agents, a communication fabric, one or more data stores, and link controllers for efficiently powering down links in a communication fabric. For example, in some embodiments, SoC 806 includes components similar to computing system 100 (of FIG. 1) and computing system 200 (of FIG. 2). In various embodiments, SoC 806 is coupled to external memory 802, peripherals 804, and power supply 808.

A power supply 808 is also provided which supplies the supply voltages to SoC 806 as well as one or more supply voltages to the memory 802 and/or the peripherals 804. In various embodiments, power supply 808 represents a battery (e.g., a rechargeable battery in a smart phone, laptop or tablet computer). In some embodiments, more than one instance of SoC 806 is included (and more than one external memory 802 is included as well).

The memory 802 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The peripherals 804 include any desired circuitry, depending on the type of system 800. For example, in one embodiment, peripherals 804 includes devices for various types of wireless communication, such as Wi-Fi, Bluetooth, cellular, global positioning system, etc. In some embodiments, the peripherals 804 also include additional storage, including RAM storage, solid state storage, or disk storage. The peripherals 804 include user interface devices such as a display screen, including touch display screens or multi-touch display screens, keyboard or other input devices, microphones, speakers, etc.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist including a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
   one or more upstream control links of an upstream control path and one or more upstream data links of an upstream data path different from the one or more upstream control links, each configured to convey data to an external upstream cluster; and a controller configured to:
   disconnect at least one link of both the upstream control path and the upstream data path based at least in part on a determination that at least two acknowledgements have been received from the external upstream cluster including an acknowledgment of a request to disconnect a link via the upstream control path and an acknowledgment of a request to disconnect a link via the upstream data path; and
   maintain connection with the external upstream cluster via both the upstream control path and the upstream data path, based at least in part on a determination that fewer than the two acknowledgements have been received from the external upstream cluster.

2. The apparatus as recited in claim 1, wherein prior to disconnecting a link, the controller is configured to send a confirmation to the external upstream cluster that indicates the controller received the at least two acknowledgments, in response to determining no tasks requiring immediate processing have been received while waiting for the at least two acknowledgments.

3. The apparatus as recited in claim 2, wherein the controller is further configured to send the confirmation via at least one of the upstream control path and the upstream data path.

4. The apparatus as recited in claim 1, wherein the apparatus further comprises:
   control resources for processing commands;
   data resources for processing data corresponding to the commands;
   wherein prior to receiving the at least two acknowledgments, the controller is further configured to:
      send a request for disconnecting the upstream control path, in response to determining the control resources are idle; and
      send a request for disconnecting the upstream data path, in response to determining the data resources are idle.

5. The apparatus as recited in claim 4, wherein in response to determining either of the control resources or the data resources are idle, the control logic is further configured to determine whether all remaining tasks have a priority level below a threshold.

6. The apparatus as recited in claim 4, wherein in response to receiving a request for disconnecting a downstream control path, the controller is further configured to reject the request for disconnecting the downstream control path in response to:
   receiving a request for disconnecting the downstream data path;
   determining the upstream data path received write data of an asynchronous write request from an external cluster with no flow control; and
   determining the data resources are idle.

7. The apparatus as recited in claim 4, wherein the apparatus further comprises:
   one or more downstream control links of a downstream control path and one or more downstream data links of a downstream data path different from the one or more downstream control links, each configured to transfer data to an external downstream cluster or agent; and
   wherein the controller is further configured to send an acknowledgment of receiving a request to disconnect a link via a given downstream link of the downstream control path or the downstream data path, in response to:
      receiving a request for disconnecting a link on the given downstream link; and
      determining the control resources or the data resources corresponding to the given downstream link are idle.

8. The apparatus as recited in claim 7, wherein the controller is further configured to disconnect both the downstream control path and the downstream data path in response to receiving confirmation from the external downstream cluster or agent, wherein the confirmation indicates the external downstream cluster or agent is disconnecting both the downstream control path and the downstream data path.

9. The apparatus as recited in claim 1, wherein the controller is further configured to maintain connection with the external upstream cluster via both the upstream control path and the upstream data path based at least in part on a determination that:
   an acknowledgment has been received; and
   a number of acknowledgments received from the external upstream cluster is fewer than the two acknowledgements.

10. A method, comprising:
   conveying, by one or more upstream control links of an upstream control path and one or more upstream data links of an upstream data path different from the one or more upstream control links, data to an external upstream cluster;
   disconnecting at a first point in time, by a controller, at least one link of both the upstream control path and the upstream data path, in response to receiving at least two acknowledgements including an acknowledgment to power down the upstream control path and an acknowledgement to power down the upstream data path; and
   maintaining connection at a second point in time, by the controller, with the external upstream cluster via both the upstream control path and the upstream data path, in response to determining that a number of acknowledgments received from the external upstream cluster is fewer than the two acknowledgements.

11. The method as recited in claim 10, wherein prior to disconnecting a link, the method further comprises sending a confirmation to the external upstream cluster that indicates the controller received the at least two acknowledgments, in response to determining no tasks requiring immediate processing have been received while waiting for the at least two acknowledgments.

12. The method as recited in claim 10, further comprising:
   processing commands by control resources;
   processing data corresponding to the commands by data resources;
   prior to receiving the at least two acknowledgments:
      sending a request for disconnecting the upstream control path, in response to determining the control resources are idle; and
      sending a request for disconnecting the upstream data path, in response to determining the data resources are idle.

13. The method as recited in claim 12, further comprising:
   transferring data to an external downstream cluster or agent through one or more downstream control links of a downstream control path and one or more downstream data links of a downstream data path different from the one or more downstream control links; and
   sending an acknowledgment of receiving a request to disconnect a link via a given downstream link of the downstream control path or the downstream data path, in response to:

receiving a request for disconnecting a link on the given downstream link; and determining the control resources or the data resources corresponding to the given downstream link are idle.

14. The method as recited in claim 13, further comprising disconnecting both the downstream control path and the downstream data path, in response to receiving confirmation from the external downstream cluster or agent, wherein the confirmation indicates the external downstream cluster or agent is disconnecting both the downstream control path and the downstream data path.

15. The method as recited in claim 12, wherein in response to receiving a request for disconnecting a downstream control path, the method further comprises rejecting the request for disconnecting the downstream control path, in further response to:

receiving a request for disconnecting a link on the downstream data link;

determining the upstream data path received write data of an asynchronous write request from an external cluster with no flow control; and determining the data resources are idle.

16. A non-transitory computer readable storage medium storing program instructions, wherein the program instructions are executable by a processor to:

convey data to an external upstream cluster through one or more upstream control links of an upstream control path and one or more upstream data links of an upstream data path different from the one or more upstream control links;

disconnect at least one link of both the upstream control path and the upstream data path, in response to receiving at least two acknowledgements including an acknowledgment to power down the upstream control path and an acknowledgement to power down the upstream data path; and maintain connection with the external upstream cluster via both the upstream control path and the upstream data path, in response to determining that a number of acknowledgments received from the external upstream cluster is fewer than the two acknowledgements.

17. The non-transitory computer readable storage medium as recited in claim 16, wherein prior to disconnecting a link, the program instructions are further executable by a processor to send a confirmation to the external upstream cluster that indicates the at least two acknowledgments have been received, in response to determining no tasks requiring immediate processing have been received while waiting for the at least two acknowledgments.

18. The non-transitory computer readable storage medium as recited in claim 16, wherein the program instructions are further executable by a processor to:

process commands by control resources;

process data corresponding to the commands by data resources;

prior to receiving the at least two acknowledgments:

send a request for disconnecting the upstream control path, in response to determining the control resources are idle; and send a request for disconnecting the upstream data path, in response to determining the data resources are idle.

19. The non-transitory computer readable storage medium as recited in claim 18, wherein the program instructions are further executable by a processor to:

transfer data to an external downstream cluster or agent through one or more downstream control links of a downstream control path and one or more downstream data links of a downstream data path different from the one or more downstream control links;

send an acknowledgment of receiving a request to disconnect a link via a given downstream link of the downstream control link path or downstream data path, in response to:

receiving a request for disconnecting a link on the given downstream link; and determining the control resources or the data resources corresponding to the given downstream link are idle.

20. The non-transitory computer readable storage medium as recited in claim 18, wherein in response to receiving a request for disconnecting a downstream control path, the program instructions are further executable by a processor to reject the request for disconnecting the downstream control path, in further response to:

receiving a request for disconnecting a link on the downstream data path;

determining the upstream data path received write data of an asynchronous write request from an external cluster with no flow control; and determining the data resources are idle.

\* \* \* \* \*